(12) United States Patent
Parks

(10) Patent No.: US 12,201,127 B2
(45) Date of Patent: *Jan. 21, 2025

(54) PALM-BASED ANIMAL FEED

(71) Applicant: Palm Silage, Inc., Fountain Valley, CA (US)

(72) Inventor: James Clifford Parks, Thermal, CA (US)

(73) Assignee: Palm Silage, Inc., Fountain Valley, CA (US)

( * ) Notice: Subject to any disclaimer, the term of this patent is extended or adjusted under 35 U.S.C. 154(b) by 616 days.

This patent is subject to a terminal disclaimer.

(21) Appl. No.: 17/379,819

(22) Filed: Jul. 19, 2021

(65) Prior Publication Data

US 2022/0174987 A1 Jun. 9, 2022

Related U.S. Application Data (63) Continuation of application No. 13/794,686, filed on Mar. 11, 2013, now Pat. No. 11,064,717.

(60) Provisional application No. 61/775,435, filed on Mar. 8, 2013, provisional application No. 61/767,165, filed on Feb. 20, 2013.

(51) Int. Cl.
    *A23K 10/37* (2016.01)
    *A23K 10/30* (2016.01)
    *A23K 50/10* (2016.01)

(52) U.S. Cl.
    CPC .............. *A23K 10/37* (2016.05); *A23K 10/30* (2016.05); *A23K 50/10* (2016.05); *Y02P 60/87* (2015.11)

(58) Field of Classification Search
    None
    See application file for complete search history.

(56) References Cited

U.S. PATENT DOCUMENTS

| 3,600,188 A | 8/1971 | Wilding et al. |
| 4,363,448 A | 12/1982 | Machler et al. |

(Continued)

FOREIGN PATENT DOCUMENTS

| CA | 2319978 A1 | 3/2002 |
| CN | 201667968 U | 12/2010 |

(Continued)

OTHER PUBLICATIONS

Abdelbasset, El Hadrami et al., Emir. J. Food Agric. 2012. 24 (5): 371-385.

(Continued)

*Primary Examiner* — Felicia C Turner
(74) *Attorney, Agent, or Firm* — Knobbe Martens Olson & Bear, LLP (57) ABSTRACT

Animal feed formed with a base of palm fronds and combined with palm fruit, such as dates, is a sustainable and affordable feed product that can be developed in hot climates. Palm fronds with a desired moisture content are shredded, chopped, and/or ground, and mixed with palm fruit. Additives such as urea can increase the nutritional content. Feeds with palm fronds, palm fruit, and/or additives can serve as a base feed for other components. Palm fronds can also serve as a base feed for other components. Animal feeds with a variety of bases can have palm fruit added. Animal feeds with a variety of bases, including palm fronds, can include a variety of other components added.

20 Claims, 8 Drawing Sheets

(56) References Cited

U.S. PATENT DOCUMENTS

| | | | |
|---|---|---|---|
| 4,428,969 | A | 1/1984 | Müller et al. |
| 4,460,292 | A | 7/1984 | Durham |
| 4,578,275 | A | 3/1986 | Spanier |
| 4,680,190 | A | 7/1987 | Spiel |
| 5,120,565 | A | 6/1992 | Lanter et al. |
| 5,236,717 | A | 8/1993 | Vinci |
| 5,250,307 | A | 10/1993 | Cummings |
| 5,540,932 | A | 7/1996 | Lanter et al. |
| 5,683,739 | A | 11/1997 | Lanter et al. |
| 5,855,943 | A | 1/1999 | Lush et al. |
| 7,296,537 | B2 | 11/2007 | Burghardi |
| 10,711,420 | B2 | 7/2020 | Parks |
| 11,297,853 | B2 | 4/2022 | Jimenez-Marquez et al. |
| 11,346,068 | B2 | 5/2022 | Parks |
| 2006/0160907 | A1* | 7/2006 | Stamp .......... A01G 24/28 516/100 |
| 2007/0277739 | A1 | 12/2007 | Wang et al. |
| 2008/0089998 | A1 | 4/2008 | Chou |
| 2008/0146520 | A1 | 6/2008 | Block et al. |
| 2008/0171297 | A1 | 7/2008 | Reynolds |
| 2009/0062516 | A1 | 3/2009 | Belanger et al. |
| 2010/0167351 | A1 | 7/2010 | Eyal et al. |
| 2010/0233320 | A1 | 9/2010 | Sunvold et al. |
| 2011/0297885 | A1 | 12/2011 | Boerrigter et al. |
| 2012/0040029 | A1 | 2/2012 | Sambanthamurthi et al. |
| 2012/0315339 | A1 | 12/2012 | Duval et al. |
| 2013/0012610 | A1 | 1/2013 | Belanger et al. |
| 2014/0234524 | A1 | 8/2014 | Parks |
| 2016/0007630 | A1 | 1/2016 | Parks |
| 2019/0048307 | A1 | 2/2019 | Morash et al. |
| 2020/0156125 | A1 | 5/2020 | Parks |
| 2021/0164182 | A1 | 6/2021 | Parks |
| 2022/0183321 | A1 | 6/2022 | Parks |

FOREIGN PATENT DOCUMENTS

| | | | |
|---|---|---|---|
| EP | 2342973 | | 7/2011 |
| EP | 2 546 352 | | 1/2013 |
| GB | 797763 | A * | 7/1958 |
| GB | 2 185 673 | | 7/1987 |
| GB | 2200027 | A * | 7/1988 .......... A23K 10/30 |
| GB | 2 257 012 | | 1/1993 |
| JP | 62-158457 | | 7/1987 |
| JP | 62-239957 | | 10/1987 |
| JP | 2002-51707 | | 2/2002 |
| WO | WO 1996/17525 | | 6/1996 |
| WO | WO 1997/33488 | | 9/1997 |
| WO | WO 1999/42422 | | 8/1999 |
| WO | WO 2004/039751 | | 5/2004 |
| WO | WO 2004/080197 | | 9/2004 |
| WO | WO 2007/100251 | | 9/2007 |
| WO | WO 2009/110782 | | 9/2009 |
| WO | WO 2010/056940 | | 5/2010 |
| WO | WO 2010/117255 | | 10/2010 |
| WO | WO 2012/050431 | | 4/2012 |
| WO | WO 2013/096698 | | 6/2013 |
| WO | WO 2014/130578 | | 8/2014 |
| WO | WO 2015/014497 | | 2/2015 |
| WO | WO 2018/175921 | | 9/2018 |

OTHER PUBLICATIONS

Al-Dobaib, S N et al., Effect of feeding discarded dates on milk yield and composition of Aradi goats, Small Ruminant Research, Elsevier, Amsterdam, NL, vol. 81, No. 2-3, Feb. 1, 2009.
Armcon Engineering downloaded from https://www.youtube.com/watch?v= J8omAdfMNs, 3 pages dated Feb. 9, 2007.
Barreveld, W.H., Date Palm Products, FAO Agricultural Services Bulletin No. 101, Food and Agricultur Organization of the United nations Rome 1993, in 16 pages.
Belal, Ibrahim E.H., et al., Evalutaion of date-feed ingredients mixes, Animal Feed Science and technology, 81 (1999) pp. 291-298.
Bengaly, K., et al., Utilization of Steam-processed Oil Palm (*Elaeis guineensis*) Frond by Ruminants in Malaysia: Investigations for nitrogen supplementation. African Journal of Agricultural Research, vol. 5 (16), pp. 2131-2136, 2010 in 6 pages.
Biofuel Co-Products as Livestock Feed, Opportunities and Challenges, Food and Agriculture Organization of the United Nations, Rome, 2012, Chapters 1-5 in 116 pages.
Biofuel Co-Products as Livestock Feed, Opportunities and Challenges, Food and Agriculture Organization of the United Nations, Rome, 2012, Chapters 6-11 in 123 pages.
Biofuel Co-Products as Livestock Feed, Opportunities and Challenges, Food and Agriculture Organization of the United Nations, Rome, 2012, Chapters 12-17 in 81 pages.
Biofuel Co-Products as Livestock Feed, Opportunities and Challenges, Food and Agriculture Organization of the United Nations, Rome, 2012, Chapters 18-24 in 133 pages.
Biofuel Co-Products as Livestock Feed, Opportunities and Challenges, Food and Agriculture Organization of the United Nations, Rome, 2012, Chapters 25-28 in 87 pages.
Bob's Red Mill: Date Powder, downloaded from www.lifestylemarkets.com, dated May 3, 2006, 2 pages.
Canampak Dates Industry (Pvt) Ltd., International Suppliers of Dates, All About Dates [online] (full content), Copyright 2009, [printed Jul. 9, 2014]. Retrieved from the Internet: <URL: http://www.canampakdates.com/about-dates.htm>.
Chandrasekaran et al. Saudi J. Biol. Sci. Apr. 2013, 20(2), pp. 105-120.
"Converting Waste Oil Palm Trees Into a Resource," United Nations Environment Programme, 2012 in 202 pages.
Dahlan, I., et al., Nutrient Intake and Digestibility of Fresh, Ensiled and Pelleted Oil Palm (*Elaeis guineensis*) Frond by Goats. Department of Animal Science, Faculty of Agriculture, Universiti Putra Malaysia, pp. 1407-1413, 2000 in 7 pages.
Dahlan, I., Oil Palm Frond, a Feed for Herbivores. Asian-Aus. J. anim. Sci. 13 Supplement, pp. 300-303, 2000 in 4 pages.
Devendra, C., et al.,—Invited Review—Feed Resources for Animals in Asia: Issues, Strategies for Use, Intensification and Integration for Increased Productivity. The Asian-Australasian Association of Animal Production Societies, vol. 24, No. 3, pp. 303-321, Mar. 2011 in 19 pages.
Devendra, C., Intensification of Integrated Oil Palm—ruminant Systems. Outlook on Agriculture, vol. 38, No. 1, pp. 71-81, 2009 in 11 pages.
Duran, A.O., 1998, The African palm: A strategic resource for integrated systems of tropical production. First FAO Electronic conference on tropical Feeds and Feeding Systems. FAO Animal Production and Health Paper, FAO, Rome, 13 pages.
Genin D., et al.. Valorisation of date-palm by-products (DPBP) for livestock feeding in Southern Tunisia. I—Potentialities and traditional utilisation. In : Ben Saem H. (ed.), Nefzaoui A. (ed), Morand-Fehr P. (ed). Nutrition and feeding strategies of sheep and goats under harsh climates. Zaragoza : CIHEAM, 2004. p. 221-226.
Global Environment Centre Foundation Annual Report 2012, Issued Mar. 2014 in 28 pages.
Google Search Report on "seed processing with grinder, screen and baffle," retrieved on Oct. 27, 2022 in 3 pages.
Goto, T., et al., Simple analytical method for aflatoxin contamination in dried oil palm frond (OPF) and OPF base feed. Mycotoxins, vol. 52 (2), pp. 123-128, 2002 in 6 pages.
Hamza, Akila, et al., Use of different silages as new feed resources for ruminants. Archiva Zootechnica 12:2, pp. 79-88, 2009 in 10 pages.
Hassan, O. Abu, et al., Oil-Palm Fronds as a Roughage Feed Source for Ruminants in Malaysia. Malaysia Agriculture Research and Development Institute (MARDI) and National Grassland Research Institute, pp. 1-8, 1996 in 8 pages.
Hassim, H.A., et al, "Dietary inclusion of oil palm fronds does not change n-6 nor n-3 content of lamb tissue", Small Ruminant Research, Elsevier, Amsterdam, NL, vol. 112, No. 1, Oct. 3, 2012, pp. 69-72, XP028547783, ISSN: 09-21-4488, DOI: 10.1016/J.SmallRumres.2012-09-007 *abstract* *Paragraph "2.1 Animals and diets"*.

(56) References Cited

OTHER PUBLICATIONS

Hassim, H.A., et al, Effect of different inclusion levels of oil palm fronds on in vitro rumen fermentation pattern, fatty acid metabolism and apparent biohydrogenation of linoleic and linolenic acid. Animal Feed Science and Technology, vol. 162, pp. 155-158, 2010 in 4 pages.

Heuzé V., Sauvant D., Tran G., 2012. Oil Palm Fronds and Oil Palm Crop Residues. Feedipedia.org. A programme by INRA, CIRAD, AFZ and FAO. http://www.feedipedia.org/node/6916. Last updated on Jul. 10, 2012, 11:26. Accessed May 14, 2013 in 3 pages.

Husin, M., et al., Availability and Potential Utilisation of Oil Palm Trunks and Fronds Up to the Year 2000. PORIM Occasional Paper, No. 20, 17 pages plus book cover and table of contents, 1986 in 21 pages.

International Search Report and Written Opinion for International Application No. PCT/US2014/017207, mailed on Jun. 11, 2004 in 13 pages.

Ishida, M., et al., Utilization of Oil Palm Frond as Cattle Feed. JARQ, vol. 31, pp. 41-47, 1997 in 7 pages.

Islam, M., et al., Productivity and Nutritive Values of Different Fractions of Oil Palm (*Elaeis guineensis*) Frond. Department of Animal Science, Universiti Putra Malaysia, pp. 1113-1120, 2000 in 8 pages.

Jalaludin, S., Integrated Animal Production in the Oil Palm Plantation. Universiti Pertanian Malaysia, pp. 1-4, 1996 in 4 pages.

Kawamoto, H., et al., Palatability, Digestibility and Voluntary Intake of Processed Oil Palm Fronds in Cattle. JARQ, vol. 35 (3), pp. 195-200, 2001 in 6 pages.

Khamseekhiew, B., et al., Ruminal and Intestinal Digestibility of Some Tropical Legume Forages. Department of animal Science, Universiti Putra Malaysia, pp. 321-325, 2001 in 5 pages.

Lim, K.O., et al., Plant Based Energy Potential and Biomass Utilization in Malaysia. International Energy Journal, vol. 1, No. 2, pp. 77-88, 2000 in 12 pages.

Mahgoub et al., Effects of feeding ensiled data palm fronds and a by-roduct concentrate on performance and meat quality of Omani sheep, Amimal Feed Science and Technology, Amsterdam, NL, vol. 135, No. 3-4, May 5, 2007.

Mahgoub, et al. Dates:Production, Processing, Food and Medicinal Values; A. Manackavasagan, M. Mohamed Essa, and E. Sukumar CRC Press 2012, Chapter 23, pp. 323-338; Print ISBN: 978-1-4398-4945-3 eBook ISBN: 978-1-4398-4947-7.

Mahgoub, Osman, et al., Effects of feeding ensiled data palm fronds and a by-product concentrate on performance and meat quality of Omani sheep, Animal Feed Science and Technology, 135 (2007) 210-221.

Medjekal, S., Arhab, R., and Bousseboua, H., "Nutritive value assessment of some desert by-products by gas production and rumen fermentation in vitro," Livestock Research for Rural Development 23 (3) 2011, Published Mar. 6, 2011, http://www.lrrd.org/lrrd23/3/medj23046.htm, printed Mar. 17, 2015.

"Nutrient Requirements of Beef Cattle—Oklahoma State University", downloaded from pods.dasnr.okstate.edu/docushare/dsweb/Get/Document.../E-974web.pdf Dec. 30, 2006, 25 pages.

Office Action received in co-pending Canadian Application No. 2902053, dated Jun. 6, 2016 in 3 pages.

Office Action received in co-pending Japanese Application No. 2015-558928, mailed Feb. 29, 2016 in 8 pages including English translation.

Office Action received in co-pending Japanese Application No. 2015-558928, mailed Aug. 8, 2016 in 4 pages including English translation.

Office Action received in co-pending Korean Application No. 10-2015-7026053, dated Oct. 7, 2016 in 9 pages.

Palm Fronds are leaves, Google Search, retrieved on May 26, 2023 in 4 pages.

Palm Press Fiber, Google Search, retrieved on Oct. 27, 2022 in 4 pages.

Rasby, et al. "Understanding and Using a Feed Analysis", downloaded from Report "http"//www.ianrpubs.unl.edu/pages/publicationD.jsp?publicationld-1055, dated Sep. 2008, 11 pages.

Supplementary Partial European Search Report in co-pending European Application No. EP 14 75 4449, dated Sep. 19, 2016 in 7 pages.

Supplementary European Search Report for PCT/US2014017207 dated Jan. 17, 2017 in 10 pages.

Vaughan, et al., "Seed Processing and Handling," Seed Technology Laboratory, 1968 in 153 pages.

Zahari, M. Wan, et al., Utilization of Oil Palm Frond—Based Diets for Beef and Dairy Production in Malaysia. Journal of Animal Science, pp. 625-634, 2003 in 11 pages.

"Patent Landscape Report: Palm Oil Production and Waste Treatment Technologies", WIPO Publication No. 947/4E, 2016, in 124 pages.

\* cited by examiner

PALM-BASED ANIMAL FEED

INCORPORATION BY REFERENCE TO RELATED APPLICATIONS

Any and all priority claims identified in the Application Data Sheet, or any correction thereto, are hereby incorporated by reference under 37 CFR 1.57.

BACKGROUND OF THE INVENTION

Field of the Invention

The present disclosure relates generally to the field of animal feeds.

Description of the Related Art

Various products and combinations of products are used in animal feed. Many of them are subject to variations in weather. Current animal feeds have various limitations and disadvantages, and a need exists for further improvement.

SUMMARY OF THE INVENTION

World demand for animals and animal products is tremendous and continually growing. The U.S. cattle and dairy industries alone are billion dollar industries. They involve millions of head of cattle that consume billions of dollars of feed annually. Animal feed can come from a variety of sources, but typically involves a significant component that is from crops that are grown specifically for the purpose of serving in animal feed or that are susceptible to drought and may struggle in arid conditions. For example, alfalfa, which is regularly found in cattle feed, struggles during dry and hot seasons. The tremendous demand for cattle feed can strain resources.

Various animal feeds described herein can be based on palm fronds. Palm trees are found throughout the World in arid locations and palm fronds are frequently viewed as a source of waste or trash. Palm fronds are commonly burned or chopped up to be dispersed. However, palm fronds have a variety of nutrients. Generally, palm fronds have an estimated Total Digestible Nutrient (TDN) content that can be greater than or equal to approximately 40% and/or less than or equal to approximately 60%. For example, palm fronds from Mexican Fan Palms (*Washingtonia robustas*) have an estimated TDN content of approximately 51.8% on a dry matter basis. Similarly, Deglet Noor palm fronds can have a TDN content of approximately 52.1% on a dry matter basis. Oil palm fronds have been estimated to have a metabolizable energy (ME) content of approximately 5.65 MJ/kg. Palm fronds harvested during the spring, such as during and between March and May, can have higher energy and TDN contents than they do during other times during the year. Rather than being discarded, such palm fronds can be used in animal feed, helping generate an animal feed that is based on recycled products. Palm-based animal feeds can be used to feed a variety of animals, including horses or ruminants such as cattle, sheep, goats, or camels.

Many varieties of palms grow palm fruit, such as dates, which are also very nutritious. Generally, dates can have a TDN content that is greater than or equal to approximately 65% and/or less than or equal to approximately 90%. For example, dates from a Deglet Noor Palm tree can have a TDN content of approximately 87.9% on a dry basis. Dates from Canary Palms can have a TDN content of approximately 86.7% on a dry basis. In various embodiments described herein, dates and palm fronds can be combined in different forms and quantities in order to create a nutritious, effective, and sustainable animal feed from what was previously considered largely waste. Additionally, the main products of this feed can be grown in hot and dry conditions. In fact, these sources can thrive in conditions that might destroy products currently used in cattle feed.

In some embodiments, additional additives can be combined with palm fruit and palm fronds in order to adjust nutritional content. For example, nutritional additives, such as urea, can be included to increase the available levels of nutritional content, such as protein, within the animal feed. Various ratios of palm fronds, palm fruit, and nutritional additives are described herein.

In some embodiments, feeds with palm fronds, palm fruits, and additives such as urea can serve as an independent animal feed. The various benefits of palm and palm fruit, however, make them desirable for use together or independently in different combinations with different types of animal feeds. Thus, in some embodiments, feeds with palm fronds, palm fruits, and additives such as urea can serve as a base feed to be combined with additional components depending on the desired characteristics of a final feed. In some embodiments, palm fronds themselves can serve as a base feed to be mixed with additional components. In some embodiments, palm fruit and/or seeds can be combined with general base feeds, such as alfalfa, soy, corn, hay, or grass, which can also be mixed with a portion of palm fronds.

According to various embodiments described herein, an animal feed can include a processed palm frond component, a palm fruit component, and a nutritional additive. The palm fruit component and the nutritional additive can have a ratio by weight between 5:1 and 7:1. In some embodiments, the palm fruit can be dates. In some embodiments, the nutritional additive can be urea. In some embodiments, palm fruit component and the nutritional additive have a ratio by weight of approximately 6:1. In some embodiments, the processed palm frond component can have a moisture content between 10 and 14%. In some embodiments, the palm frond component, the palm fruit component, and the nutritional additive can have a ratio by weight of approximately 2000 parts palm frond to approximately 25 parts palm fruit to approximately 4 parts nutritional additive.

According to various embodiments described herein, a method of making an animal feed can include collecting palm fronds, shredding, chopping, or grinding the palm fronds, and combining a palm fruit component and a nutritional additive to the palm fronds, wherein the palm fruit component and the nutritional additive have a have a ratio by weight between 5:1 and 7:1. In some embodiments, the palm fruit can be date. In some embodiments the nutritional additive can be urea. In some embodiments, collecting palm fronds can include collecting palm fronds with a moisture content between about 10% and about 14%. In some embodiments, making an animal feed can include drying the palm fronds to a moisture content between about 10% and about 14%. In some embodiments, shredding, chopping, or grinding the palm fronds includes shredding the palm fronds. In some embodiments, the palm fronds can be chopped after they are shredded. In some embodiments, the palm fronds can be ground after they are chopped.

In some embodiments, the palm fruit component and the nutritional additive can have a ratio by weight of approximately 6:1. In some embodiments, the palm fruit and nutritional additive components can be combined with the palm fronds according to a ratio by weight of approximately 2000 parts palm frond to approximately 25 parts palm fruit to approximately 4 parts nutritional additive.

In some embodiments, an animal feed can include a processed palm frond component, a palm fruit component, and a nutritional additive wherein the animal feed has a nutritional content at one or more of the following levels: approximately 15% crude protein, approximately 3% crude fat, approximately 25% crude fiber, approximately 12% ash, and approximately 0.5% minerals.

In some embodiments, the animal feed can have a nutritional content that includes a crude protein content that is greater than or equal to approximately 5% and/or less than or equal to approximately 30%, a crude fat content that is greater than or equal to approximately 2% and/or less than or equal to approximately 8%, a crude fiber content that is greater than or equal to approximately 15% and/or less than or equal to approximately 45%, an ash content that is greater than or equal to approximately 4% and/or less than or equal to approximately 17%, and a mineral content that is greater than or equal to approximately 0.1% and/or less than or equal to approximately 1%.

In some embodiments, the animal feed can have a nutritional content that includes a crude protein content that is greater than or equal to approximately 12% and/or less than or equal to approximately 15%, a crude fat content that is greater than or equal to approximately 2% and/or less than or equal to approximately 5%, a crude fiber content that is greater than or equal to approximately 20% and/or less than or equal to approximately 30%, an ash content that is greater than or equal to 8% and/or less than or equal to 12%, and a mineral content that is greater than or equal to 0.3% and/or less than or equal to 0.7%.

In some embodiments, an animal feed can include a palm frond component that includes chopped palm fronds having a moisture content between 10% and 25%; a palm fruit component including one or more of dates, palm berries, and palm seeds; and a nutritional additive. In some embodiments, the palm fruit component and the nutritional additive have a ratio by weight between 5:1 and 7:1. In some embodiments, the animal feed has a crude protein content between 5% and 30% and a fiber content between 15% and 45%.

In some embodiments, a method of making an animal feed from palm fronds can include collecting palm fronds, placing the palm fronds in rows, allowing the palm fronds to dry to a moisture content of between 10% and 25%, chopping the palm fronds, grinding the palm fronds, and combining a palm fruit component and a nutritional additive to the palm fronds. In some embodiments, the ratio of palm fronds to palm fruit can be between approximately 70:1 and approximately 90:1. In some embodiments, the combined palm fronds, palm fruit, and nutritional additive can be cubed.

DETAILED DESCRIPTION OF THE PREFERRED EMBODIMENT

Animal feed formed with a base of palm fronds and combined with palm fruit, such as dates, is a sustainable and affordable feed product that can be developed in hot climates. Palm fronds with a desired moisture content are shredded, chopped and/or ground, and mixed with palm fruit. Additives such as urea can increase the nutritional content. Feeds with palm fronds, palm fruit, and/or additives can serve as a base feed for other components. Palm fronds can also serve as a base feed for other components. Animal feeds with a variety of bases can have palm fruit added. Animal feeds with a variety of bases, including palm fronds, can include a variety of other components added.

Processed palm fronds and palm fruit, such as dates, can be combined according to a variety of different ratios. For example, in some embodiments palm fronds and dates can be combined according to a ratio by weight of approximately 80 pounds of processed palm fronds for each pound of dates. In some embodiments, the ratio by weight of processed palm fronds to dates can be greater than or equal to approximately 70 and/or less than or equal to approximately 90.

In some embodiments, nutritional additives can be added to the mixture to modify the desired nutritional content. For example, in some embodiments, urea can be combined with palm fronds and dates. This can increase the available protein content. Finding the correct mixture can help maximize the protein content. If too much urea is added, it may actually diminish the total protein content of the mixture. In some embodiments, a preferred ratio by weight of dates to urea within a palm frond base can be 6:1. In some embodiments the ratio by weight of dates to urea within a palm frond base can be greater than or equal to approximately 5:1 and/or less than or equal to approximately 7:1. In some embodiments, the ratio by weight of dates to urea within a palm frond base can be greater than or equal to approximately 11:2 and/or less than or equal to approximately 13:2. In some embodiments, the identified ratios of dates to urea can be by volume instead of weight.

In some embodiments, an animal feed can include approximately 98.6% palm frond by weight, approximately 1.2% date by weight, and approximately 0.2% urea by weight. In some embodiments, an animal feed can include weight-based ratios of palm frond to date to urea of 2000 to 25 to 4. The ratios of different components can vary according to different embodiments. In some embodiments, an animal feed can include weight-based ratios of palm frond to date to urea of 2000 to 24 to 4. In some embodiments, the weight-based ratio of palm frond to the combined weight of dates and urea can be between 65:1 and 75:1.

The dates can be added to the palm fronds according to a variety of methods. In some embodiments, the dates can be diced, chopped, or crumbled and mixed in as such. In some embodiments the dates can be chopped into fine crystals, having a consistency roughly equivalent to sugar. In some embodiments, the dates can be liquefied and poured or sprayed onto the palm fronds. In some embodiments, a liquid, such as water, can be added to the dates to make them easier to pour, spray, and/or mix with the palm fronds. In some embodiments additional additives, such as the urea, can be mixed with the dates before being mixed with the palm fronds. In some embodiments, additional additives can be added to the palm fronds before or after the dates.

The mixtures described herein can produce a product that rivals or surpasses the nutritional content of current feeds. For example, in some embodiments a mixture can have a TDN content of approximately 55%. It can have an a crude protein content of approximately 15%, a crude fat content of approximately 2.7%, a crude fiber content of approximately 25%, and an ash content of approximately 12%. In some embodiments, additional minerals can be included, either through the urea or other additive, and the final result can have approximately 0.5% of minerals.

In some embodiments a mixture can have varying levels of a crude protein content. For example, in some embodiments a mixture can have a crude protein content that is greater than or equal to approximately 5% and/or less than or equal to approximately 30%. In some embodiments, a mixture can have a crude protein content that is greater than or equal to approximately 8% and/or less than or equal to approximately 15%. In some embodiments, a mixture can have a crude protein content that is greater than or equal to approximately 12% and/or less than or equal to approximately 15%. In some embodiments, a desired protein content can depend on the type of animal expected to eat the feed. For example, in some embodiments feed prepared for dairy cattle can have a crude protein content that is greater than or equal to approximately 10% and/or less than or equal to approximately 20%. In some embodiments, feed prepared for beef cattle can have a crude protein content that is greater than or equal to approximately 20% and/or less than or equal to approximately 30%.

Other nutritional content of mixtures described herein can similarly vary. For example, in some embodiments a mixture can have a TDN that is greater than or equal to approximately 45% and/or less than or equal to approximately 65%. In some embodiments a mixture can have a TDN that is greater than or equal to approximately 50% and/or less than or equal to approximately 60%.

In some embodiments a mixture can have a crude fat content that can be greater than or equal to approximately 2% and/or less than or equal to approximately 8%. In some embodiments a mixture can have a crude fat content that can be greater than or equal to approximately 2% and/or less than or equal to approximately 5%.

Similarly, in some embodiments a mixture can have a fiber content that can be greater than or equal to approximately 15% and/or less than or equal to approximately 45%. In some embodiments, a mixture can have a fiber content that can be greater than or equal to approximately 20% and/or less than or equal to approximately 30%.

The ash content in some embodiments can be greater than or equal to 4% and/or less than or equal to 17%. In some embodiments, the ash content can be greater than or equal to approximately 8% and/or less than or equal to approximately 12%. In some embodiments laws may limit the ash content that can be in the feed, and the ash content can be capped at a legal limit, for example at 12%. The amount of minerals and/or additives can in some embodiments be greater than or equal to approximately 0.2% and/or less than or equal to approximately 1%.

The use of any type of palm frond is contemplated. For example, *Washington robustas* (Mexican Fan Palms), *Washingtonia filiferas* (California Fan Palms), *Phoenix canariensis* (Canary Island Date Palms), *Phoenix dactylifera* (Date Palms), or any other date or oil palm can be used. Similarly, any type of date can be used. In some embodiments, other fruits or materials besides dates can be used. For example, palm seeds or other types of palm fruit, such as oil palm berries, can be used instead of or in addition to dates. These alternative fruit or fruit mixtures can be combined with palm fronds and/or other additives such as urea according to the various ratios described herein.

Figure 1:
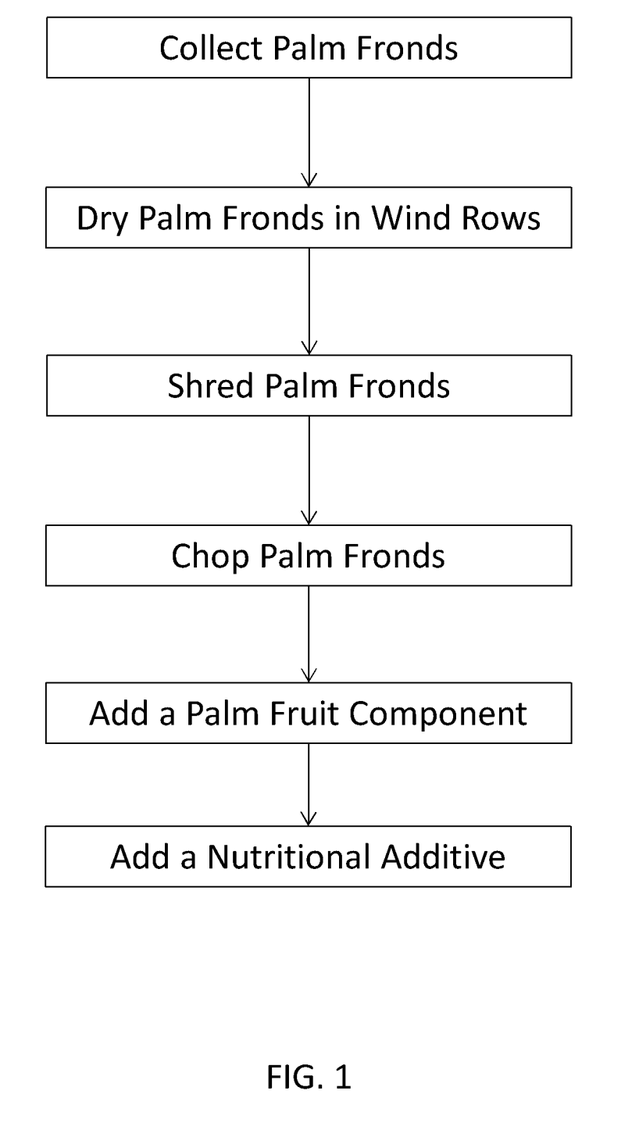
FIG. 1 is a block diagram of one embodiment of a method of preparing an animal feed.

Palm fronds can be tough, and general processing used for other types of feed bases, such as alfalfa, to prepare for use in feeds may be insufficient or too expensive for palm fronds. For example, placing raw palm fronds into a tub grinder may not produce palm fronds that are sufficiently chopped to be used in feeds. Additionally, raw palm fronds are generally too wet to be thrown directly into a tub grinder or other grinding or chopping machine. A variety of processes can be used to put the palm fronds into a form suitable for feed before combining them with dates or other products. FIG. 1 illustrates one method that can be used to process the palm fronds and combine them with palm fruit and/or other additives. Other methods can be used and variations of the described method can be used as well. In some embodiments, once palm fronds have been collected, they can be laid out in wind rows. This can allow the wind and/or ambient air to dry the palm fronds. Steps can be taken to ensure growth of mold within the palm fronds is prevented or limited. For example, the wind rows can be sized such that the palm fronds are not packed too tightly or thickly, allowing fronds in the middle to dry. Additionally or alternatively, the fronds can be periodically turned over or mixed to prevent the growth of mold and to make sure that the fronds dry evenly. Preferably the palm fronds are arranged for drying in a manner that limits the amount of heat generated by the stacked palm fronds during the drying process.

Preferably, the fronds are allowed to dry until they have a moisture content greater than or equal to approximately 10% and/or less than or equal to approximately 14% In some embodiments, a moisture content greater than or equal to approximately 10% and/or less than or equal to approximately 20% can be used. In some embodiments, a moisture content greater than or equal to approximately 5% and/or less than or equal to approximately 15% can be used. In some embodiments, a moisture content greater than or equal to approximately 10% and/or less than or equal to approximately 25% can be used. In some embodiments the moisture content can exceed 25%.

Figure 2:
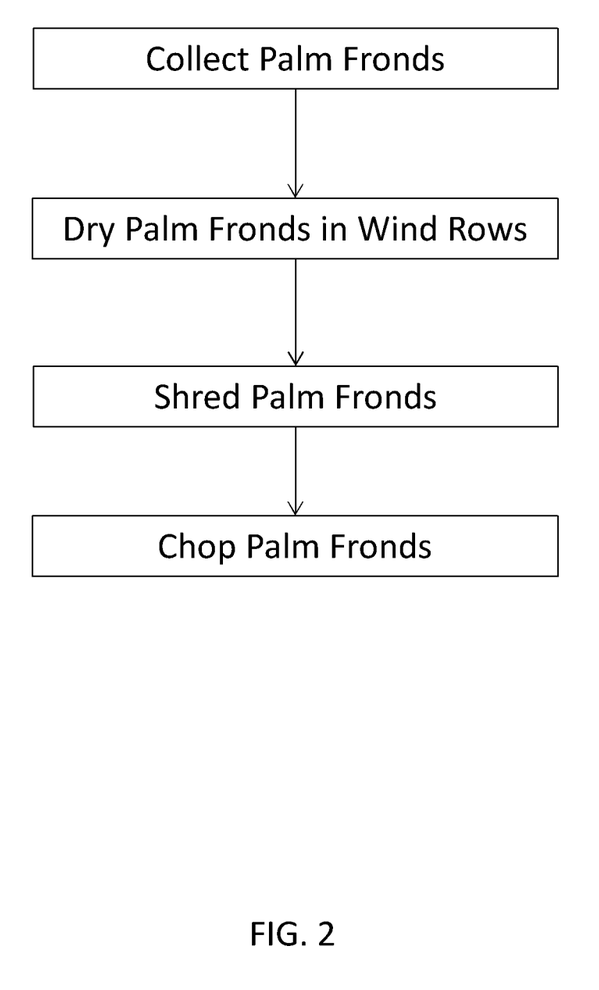
FIG. 2 is a block diagram of one embodiment of a method of processing a palm component.
Figure 3:
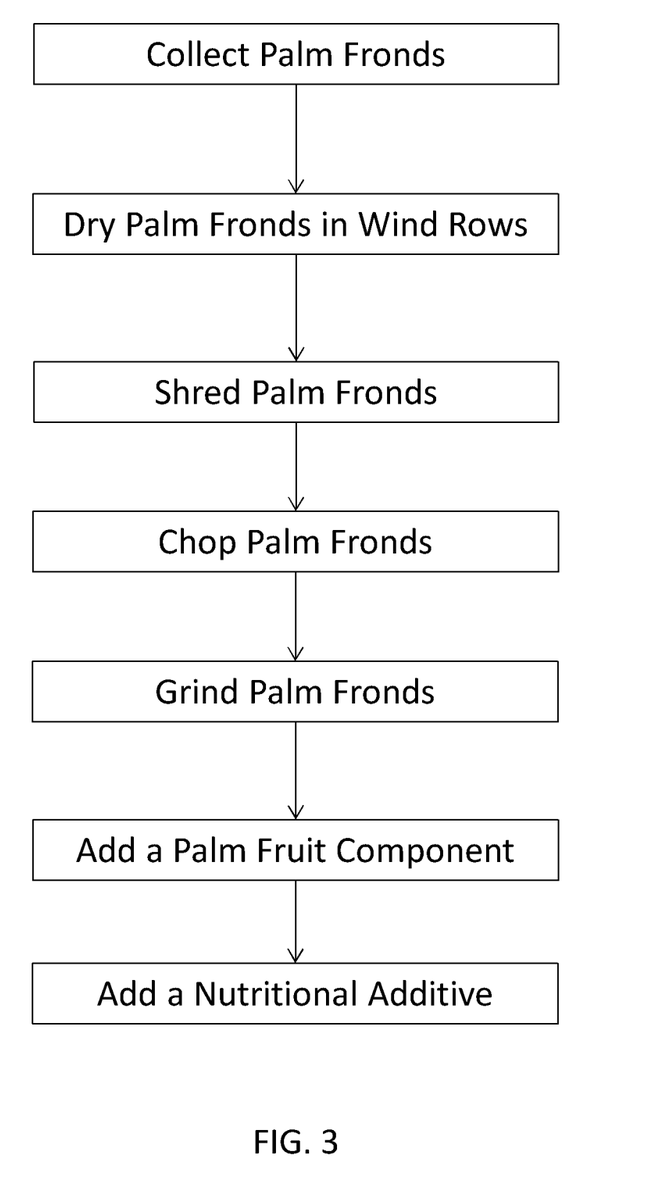
FIG. 3 is a block diagram of one embodiment of a method of preparing an animal feed.
Figure 4:
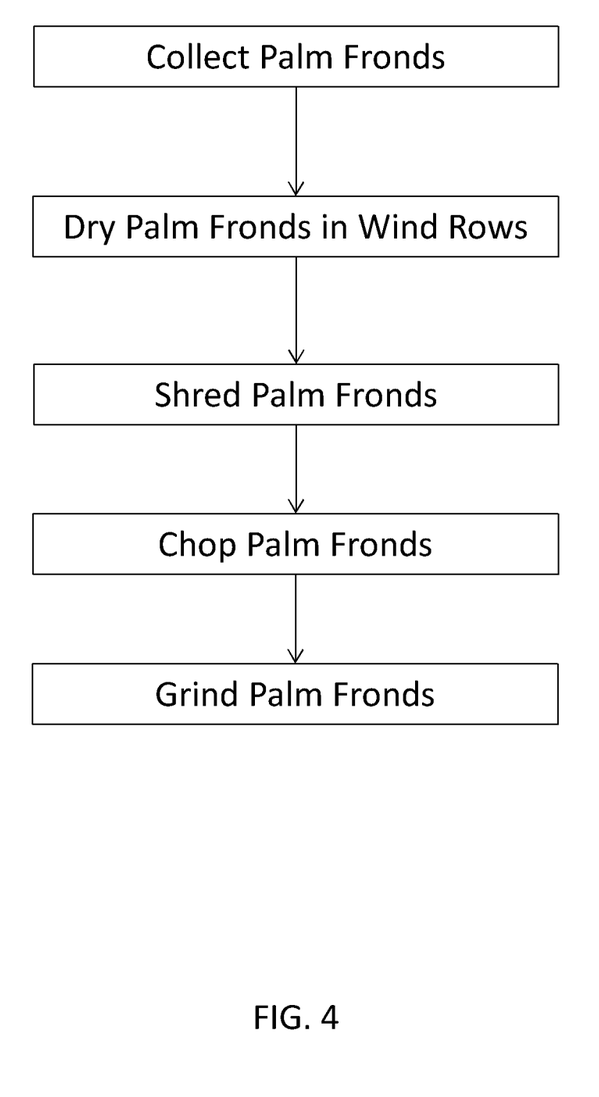
FIG. 4 is a block diagram of one embodiment of a method of processing a palm component.

Once the palm fronds have reached a desired moisture content, they can be processed according to a variety of methods. In some embodiments, a shredder can be pulled over the rows to shred the palm fronds. Additionally or alternatively, the palm fronds can be fed through a shredder. As an example, a shredder sold under the brand name Balzer can be used to shred the palm fronds. Once the palm fronds have been shredded, a chopper can be used to chop the palm fronds into finer pieces. As an example, a chopper sold under the brand name Forest Harvester can be used. The chopper can also be used to harvest the dried palm fronds from the ground, passing them into a container as they are chopped. One embodiment of this method of processing palm fronds is illustrated in FIG. 2. In some embodiments, just a shredder or just a chopper can be used. In some embodiments, as illustrated in FIG. 3, the palm fronds can be ground, such as by passing through a tub grinder after being shredded and/or chopped. As an example, a tub grinder sold under the brand name Roto Grind can be used. In some embodiments, palm fronds can pass through a grinder multiple times or through multiple grinders. In some embodiments, a cone grinder can be used instead of or in addition to a tub grinder. One embodiment of a method of processing palm fronds with a grinder is illustrated in FIG. 4.

The processed palm fronds can form a base product that can be combined according to the various mixtures described above, forming an animal feed. In some embodiments, various mixtures can be formed within a grinder. Once a desired formulation has been achieved, the products can be prepared for use according to a variety of manners. In some embodiments, the feed can be left loose as initially mixed. In some embodiments, the feed can be baled or formed into cubes or other shapes. One advantage of mixing dates into the palm fronds is that the dates can help provide a binding function, making it easier to form the feed into cubes or any desired shape. It is understood that "cube" is a broad term and is used in its ordinary sense in this application, including, for example, to refer broadly to a compressed feed mixture. References to a cubed shape can refer to a generally square or rectangular shape or to having a generally square or rectangular shaped cross section, but other shapes and cross sections are possible and contemplated, such as, for example, pellets and/or generally cylindrical shapes and/or shapes with a circular or rounded cross section. Cubed feed may have one or more sides or dimensions that are longer than one or more of the other sides or dimensions. In some embodiments, different cubes within a batch of cubed feed may have different dimensions from other cubes within the batch. Additionally, the cubes do not necessarily have defined shapes, sides, edges or corners.

In some embodiments cubes can be formed with a cubing machine. In some embodiments, the machine can include a grinder that can mix and/or grind the components. In such embodiments, the grinder of the cubing machine can be used in addition to or instead of a grinder during the process described with respect to FIG. 2. In some embodiments, the palm fronds added to the cubing machine can have been ground into a powder. The machine can convey the resulting feed toward an area that can heat and compress the feed through a die or dies that shapes the feed into a cubed shape. In some embodiments a liquid, such as water, can be added to the mixture as it is compressed through a die. Different dies can produce cubes of different sizes and/or shapes. After the feed passes through the die or dies the feed can be conveyed to an area for packaging and/or shipping. In some embodiments, the palm component can be processed into a powder that can be combined with the palm fruit component and one or more nutritional additives and then compressed or formed into cubes and/or other shapes. In some embodiments a powdered palm component can be collected and stored for use as a base or component for other feed mixtures. In some embodiments a palm component in a shredded, chopped, or ground form can be collected and stored for use as a base or component for other feed mixtures.

Cubing the feed can present a variety of advantages. For example, cubed feed can be generally easier and more efficient to ship and/or store. For example, because cubes can be compressed when formed, they can have a greater density than loose feed allowing for more feed by mass to fit within the same volume. In some embodiments, cubes can be shipped and/or stored in large containers, such as sacks, boxes, or other containers. In some embodiments, containers can be sized to hold 1000 lbs of cubed feed. In some embodiments they can hold more or less. In some embodiments, cubes can be stored and/or shipped loosely.

Cubing the feed can also extend the shelf life of the feed. For example, in some embodiments loose feed might be good for about a year. Cubed feed can be good for significantly longer. In some embodiments, packaging loose feed or cubed feed can also extend the shelf life of the feed.

Palm Frond Base Feeds

In some embodiments various components or mixtures of components described herein can be combined with other types of feed sources to adjust desired nutritional contents of the feeds. For example, the processed palm fronds can be used as a base to which a variety of additives can be added for use in animal feed. These additives suitable for use in animal feed can include, for example, dog food, chicken livers, or other sources of protein or other nutrients. Additives can also include plant based products such as citrus products, sugar beet pulp, brewer's grain, almond husks, peanut shells, grass clipping, fruit rinds and peels, potatoes, or general vegetable scraps. Additives can also include molasses, tortilla scraps, dough and bread products, or any other processed product with nutritional value. These additives can be added to a palm frond base in any desired combination or quantity.

Figure 5:
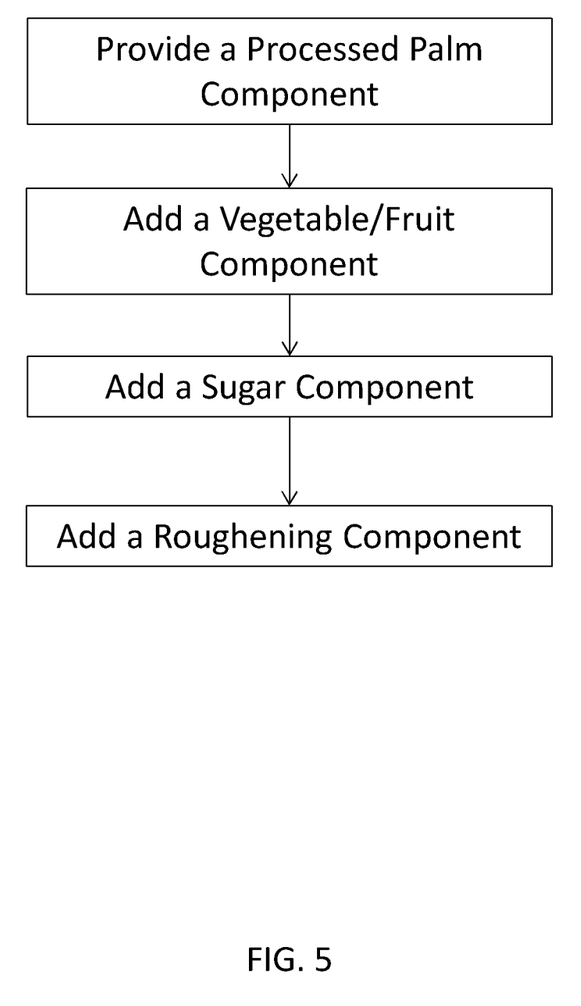
FIG. 5 is a block diagram of one embodiment of a method of preparing an animal feed.

As illustrated in FIG. 5, in some embodiments, a palm frond base can be combined with different proportions of a roughening component, a vegetable and/or fruit component, and/or a sugar component. A roughening component can include, for example, almond shells, walnut husks, peanut shells, pits, or other rough, edible products. A vegetable and/or fruit component can include, for example, cotton seed, corn, brewer's grain, distiller's grain, potato, lettuce, tomato, peaches, apples, strawberries, soy, turnips, fruit rind or peel, etc. A sugar component can include, for example, beet pulp, sugar beets, sugar cane, citrus fruits, oranges, grapefruit, lemons, grapes, raisins, etc. In some embodiments, particular additives, such as dates, have a high nutritional content and a high sugar content and can be added as a vegetable/fruit component and/or a sugar component. In some embodiments, other vitamins and minerals can also be added.

In some embodiments, the proportions used for an animal feed can depend on the type of animal that is expected to eat it. Although various embodiments described below provide examples specific to dairy and beef cows, it is understood that the various ratios described can be used in feed for a variety of animals, including horses or ruminants such as cattle, sheep, goats, or camels. In some embodiments, an animal feed for a dairy cow can have a palm frond component that is greater than or equal to approximately 50% and/or less than or equal to approximately 90%. The feed can have a roughening component that is greater than or equal to approximately 2% and/or less than or equal to approximately 10%. The feed can have a vegetable/fruit component that is greater than or equal to approximately 10% and/or less than or equal to approximately 20%. The feed can have a sugar component that is greater than or equal to approximately 5% and/or less than or equal to approximately 15%.

In some embodiments, an animal feed for a dairy cow can have a palm frond component that is greater than or equal to approximately 60% and/or less than or equal to approximately 80%. The feed can have a roughening component that is greater than or equal to approximately 3% and/or less than or equal to approximately 7%. The feed can have a vegetable/fruit component that is greater than or equal to approximately 13% and/or less than or equal to approximately 17%. The feed can have a sugar component that is greater than or equal to approximately 8% and/or less than or equal to approximately 12%.

In some embodiments, an animal feed for a dairy cow can have a palm frond component that is approximately 70%. The feed can have a roughening component that is 5%. The feed can have a vegetable/fruit component that is approximately 15%. The feed can have a sugar component that is approximately 10%.

In some embodiments, an animal feed for a beef cow can have a palm frond component that is greater than or equal to approximately 40% and/or less than or equal to approximately 60%. The feed can have a vegetable/fruit component that is greater than or equal to approximately 15% and/or less than or equal to approximately 35%. The feed can have a sugar component that is greater than or equal to approximately 15% and/or less than or equal to approximately 35%. In some embodiments, the feed can also have varying amounts of a roughening component.

In some embodiments, an animal feed for a beef cow can have a palm frond component that is greater than or equal to approximately 45% and/or less than or equal to approximately 55%. The feed can have a vegetable/fruit component that is greater than or equal to approximately 20% and/or less than or equal to approximately 30%. The feed can have a sugar component that is greater than or equal to approximately 20% and/or less than or equal to approximately 30%. In some embodiments, the feed can also have varying amounts of a roughening component.

In some embodiments, an animal feed for a beef cow can have a palm frond component that is approximately 50%. The feed can have a vegetable/fruit component that is approximately 25%. The feed can have a sugar component that is approximately 25%. In some embodiments, the feed can also have varying amounts of a roughening component.

Palm Frond and Palm Fruit Base Feeds

Figure 6:
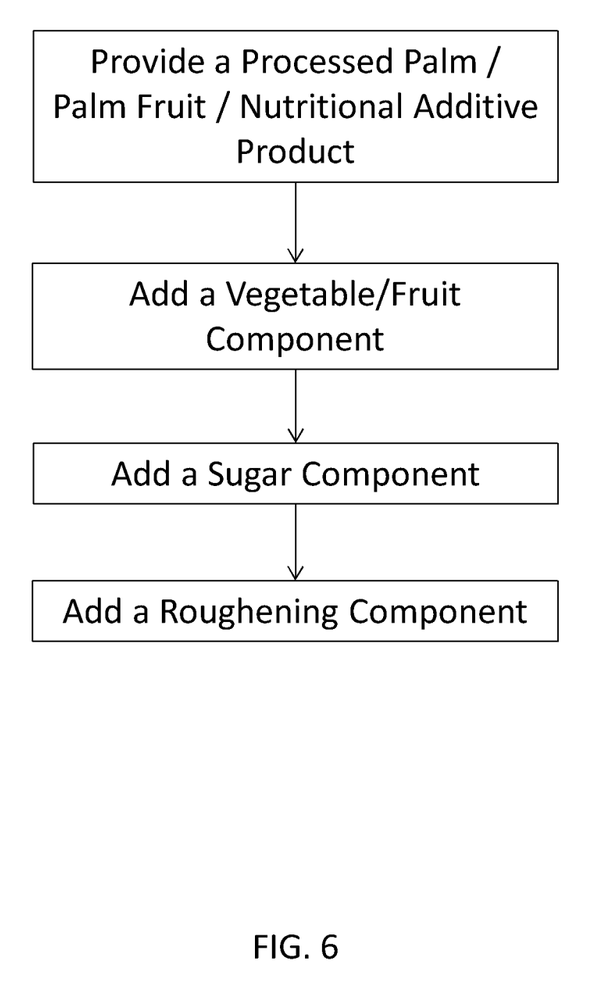
FIG. 6 is a block diagram of one embodiment of a method of preparing an animal feed.

As illustrated in FIG. 6, in some embodiments, animal feeds described herein that include a combination of a palm frond component and a palm fruit component (including embodiments with nutritional additives, such as, for example, urea) can form a base for animal feed that can replace other bases, such as alfalfa. The combined palm frond/fruit base can be in any form described above, including as loose feed, feed prepared into cubes, feed prepared into other shapes, etc. As above, the particular ratios can vary depending on the type of animal, though the various ratios described can be used for a variety of different animals.

In some embodiments, an animal feed for a dairy cow can have a palm frond/fruit base that is greater than or equal to approximately 70% and/or less than or equal to approximately 90%. The feed can have a vegetable/fruit component that is greater than or equal to approximately 5% and/or less than or equal to approximately 15%. The feed can have a sugar component that is greater than or equal to approximately 5% and/or less than or equal to approximately 15%. In some embodiments, the feed can also have varying amounts of a roughening component.

In some embodiments, an animal feed for a dairy cow can have a palm frond/fruit base that is greater than or equal to approximately 75% and/or less than or equal to approximately 85%. The feed can have a vegetable/fruit component that is greater than or equal to approximately 7% and/or less than or equal to approximately 13%. The feed can have a sugar component that is greater than or equal to approximately 7% and/or less than or equal to approximately 13%. In some embodiments, the feed can also have varying amounts of a roughening component.

In some embodiments, an animal feed for a dairy cow can have a palm frond/fruit base that approximately 80%. The feed can have a vegetable/fruit component that is approximately 10%. The feed can have a sugar component that is approximately 10%. In some embodiments, the feed can also have varying amounts of a roughening component.

In some embodiments, an animal feed for a beef cow can have a palm frond/fruit base that is greater than or equal to approximately 40% and/or less than or equal to approximately 70%. The feed can have a vegetable/fruit component that is greater than or equal to approximately 20% and/or less than or equal to approximately 40%. The feed can have a sugar component that is greater than or equal to approximately 5% and/or less than or equal to approximately 15%. In some embodiments, the feed can also have varying amounts of a roughening component.

In some embodiments, an animal feed for a beef cow can have a palm frond/fruit base that is greater than or equal to approximately 45% and/or less than or equal to approximately 60%. The feed can have a vegetable/fruit component that is greater than or equal to approximately 25% and/or less than or equal to approximately 35%. The feed can have a sugar component that is greater than or equal to approximately 7% and/or less than or equal to approximately 13%. In some embodiments, the feed can also have varying amounts of a roughening component.

In some embodiments, an animal feed for a beef cow can have a palm frond/fruit base that approximately 50%. The feed can have a vegetable/fruit component that is approximately 30%. The feed can have a sugar component that is approximately 10%. In some embodiments, the feed can also have varying amounts of a roughening component.

General Base Feeds

Figure 7:
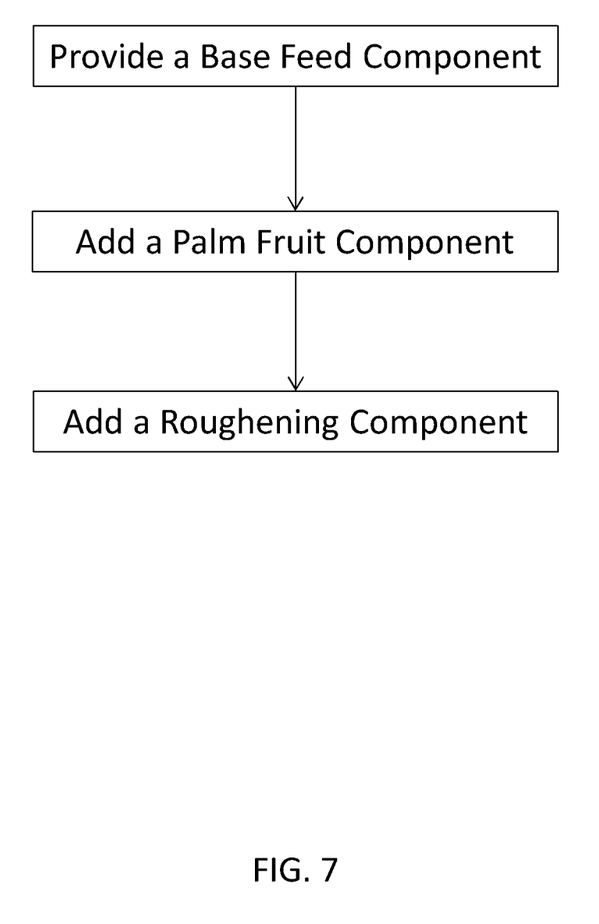
FIG. 7 is a block diagram of one embodiment of a method of preparing an animal feed.

In some embodiments, palm fruit and/or seeds can be added to different types of feed or feed bases, including, for example, alfalfa, soy, corn, hay, grass, and other silage. Palm fruit combined according to any of the ratios described herein, or in other suitable ratios, with a nutritional additive, such as urea, can also be added to other types of feeds or components of feeds, such as, for example, alfalfa, soy, corn, hay, grass, and other silage. Because of the particular nutritional qualities of palm fruit, in some embodiments palm fruit can serve as both a vegetable/fruit component and a sugar component as part of the various ratios discussed above. For example, a palm fruit contains a high energy content and can be substituted for corn, for example, in some feed applications. Additionally, some palm fruits, such as dates, include pits, which can provide a roughening component in some embodiments. FIG. 7 illustrates an example of a feed with a palm fruit component that serves as both a vegetable/fruit component and a sugar component.

Figure 8:
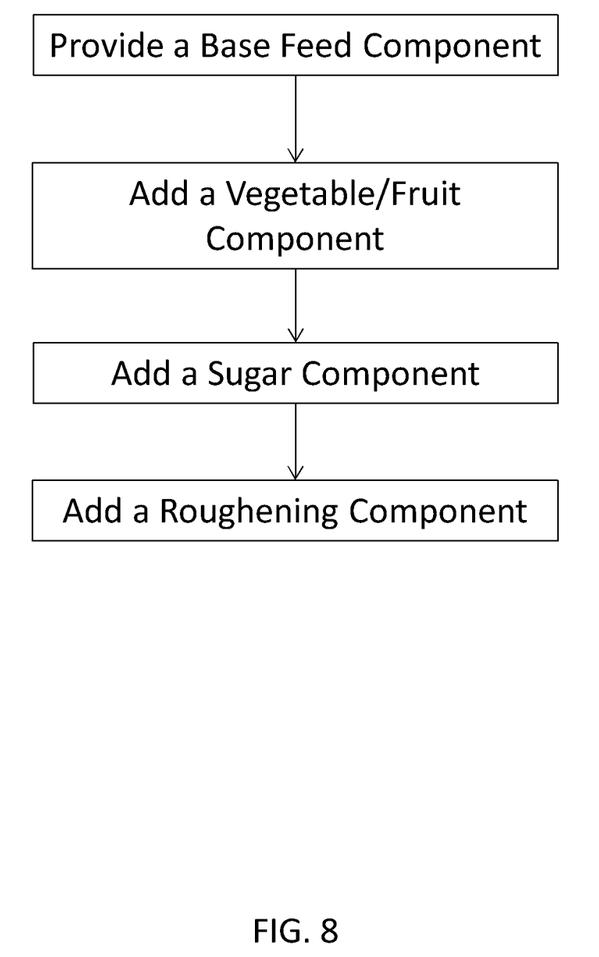
FIG. 8 is a block diagram of one embodiment of a method of preparing an animal feed.

In some embodiments, an animal feed can have a base feed component including one or more types of base feeds, such as palm frond, alfalfa, soy, corn, hay, grass, and/or other silage components, forming the base feed component. FIG. 8 illustrates an example of a base feed component mixed with a vegetable/fruit component, a sugar component, and a roughening component. In some embodiments, an animal feed can have a base feed component that is greater than or equal to approximately 50% and/or less than or equal to approximately 90%. The feed can have a roughening component that is greater than or equal to approximately 2% and/or less than or equal to approximately 10%. The feed can have a vegetable/fruit component that is greater than or equal to approximately 10% and/or less than or equal to approximately 20%. The feed can have a sugar component that is greater than or equal to approximately 5% and/or less than or equal to approximately 15%.

In some embodiments, an animal feed can have a base feed component that is greater than or equal to approximately 60% and/or less than or equal to approximately 80%. The feed can have a roughening component that is greater than or equal to approximately 3% and/or less than or equal to approximately 7%. The feed can have a vegetable/fruit component that is greater than or equal to approximately 13% and/or less than or equal to approximately 17%. The feed can have a sugar component that is greater than or equal to approximately 8% and/or less than or equal to approximately 12%.

In some embodiments, an animal feed can have a base feed component that is approximately 70%. The feed can have a roughening component that is 5%. The feed can have a vegetable/fruit component that is approximately 15%. The feed can have a sugar component that is approximately 10%.

In some embodiments, an animal feed can have a base feed component that is greater than or equal to approximately 40% and/or less than or equal to approximately 60%. The feed can have a vegetable/fruit component that is greater than or equal to approximately 15% and/or less than or equal to approximately 35%. The feed can have a sugar component that is greater than or equal to approximately 15% and/or less than or equal to approximately 35%. In some embodiments, the feed can also have varying amounts of a roughening component.

In some embodiments, an animal feed can have a base feed component that is greater than or equal to approximately 45% and/or less than or equal to approximately 55%. The feed can have a vegetable/fruit component that is greater than or equal to approximately 20% and/or less than or equal to approximately 30%. The feed can have a sugar component that is greater than or equal to approximately 20% and/or less than or equal to approximately 30%. In some embodiments, the feed can also have varying amounts of a roughening component.

In some embodiments, an animal feed can have a base feed component that is approximately 50%. The feed can have a vegetable/fruit component that is approximately 25%. The feed can have a sugar component that is approximately 25%. In some embodiments, the feed can also have varying amounts of a roughening component.

In some embodiments, an animal feed can have a base feed component that is greater than or equal to approximately 50% and/or less than or equal to approximately 90%. The feed can have a roughening component that is greater than or equal to approximately 2% and/or less than or equal to approximately 10%. The feed can have a palm fruit component, such as dates, that is greater than or equal to approximately 2% and/or less than or equal to approximately 50%.

In some embodiments, an animal feed can have a base feed component that is greater than or equal to approximately 60% and/or less than or equal to approximately 80%. The feed can have a roughening component that is greater than or equal to approximately 3% and/or less than or equal to approximately 7%. The feed can have a palm fruit component, such as dates, that is greater than or equal to approximately 5% and/or less than or equal to approximately 40%.

In some embodiments, an animal feed can have a base feed component that is approximately 70%. The feed can have a roughening component that is 5%. The feed can have a palm fruit component, such as dates, that is 25%.

In some embodiments, an animal feed can have a base feed component that is greater than or equal to approximately 40% and/or less than or equal to approximately 60%. The feed can have a palm fruit component, such as dates, that is greater than or equal to approximately 10% and/or less than or equal to approximately 45%. In some embodiments, the feed can also have varying amounts of a roughening component.

In some embodiments, an animal feed can have a base feed component that is greater than or equal to approximately 45% and/or less than or equal to approximately 55%. The feed can have a palm fruit component, such as dates, that is greater than or equal to approximately 15% and/or less than or equal to approximately 35%. In some embodiments, the feed can also have varying amounts of a roughening component.

In some embodiments, an animal feed can have a base feed component that is approximately 50%. The feed can have a palm fruit component, such as dates, that is approximately 30%. In some embodiments, the feed can also have varying amounts of a roughening component.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A method for processing a palm pellet product, comprising:
    providing a palm frond component, a palm fruit component, and a nutritional additive component; wherein the palm frond component is ground palm frond that has a moisture content of less than 14%; wherein the palm fruit component is dates; wherein the nutritional additive component is a grain; and
    combining the palm frond component, the palm fruit component, and the nutritional additive component in a mixture; and
    compressing the mixture to form a pelletized mixture, wherein the pelletized mixture comprises between about 40% and about 60% ground palm frond by weight, wherein the pelletized mixture comprises between about 10% and about 45% dates by weight, and wherein the pelletized mixture has a nutritional content of between about 5% and about 30% crude protein, between about 2% and about 8% crude fat, and between about 15% and about 45% crude fiber.

2. The method of claim 1, wherein the ground palm frond is from palms selected from the group consisting of *Washingtonia robusta* palms, *Washingtonia filifera* palms, *Phoenix dactylifera* palms, and *Phoenix canariensis* palms.

3. The method of claim 1, wherein the dates are selected from the group of palms consisting of Deglet Noor palms and Canary palms.

4. The method of claim 1, wherein the pelletized mixture comprises between about 4% and about 17% ash, and wherein the pelletized mixture comprises between about 0.1% to about 1% minerals.

5. The method of claim 1, wherein the pelletized mixture has a total digestible nutrient (TDN) content of between about 45% and about 65%.

6. A palm pellet product, comprising:
pellets comprised of a compressed mixture of a palm frond component, a palm fruit component, and a nutritional additive component, wherein the palm frond component is ground palm frond that has a moisture content of less than 14%, wherein the palm fruit component is dates, and wherein the nutritional additive component is a grain; and
wherein the pellets comprise between about 40% and about 60% ground palm frond by weight, wherein the pellets comprise between about 10% and about 45% dates by weight, and wherein the pellets have a nutritional content of between about 5% and about 30% crude protein, between about 2% and about 8% crude fat, and between about 15% and about 45% crude fiber.

7. The product of claim 6, wherein the pellets comprise between about 15% and about 45% dates by weight.

8. The product of claim 6, wherein the pellets comprise between about 10% and about 35% dates by weight.

9. The product of claim 6, wherein the pellets comprise between about 15% and about 35% grain by weight.

10. The product of claim 6, wherein the pellets comprise more than about 30% grain by weight.

11. The product of claim 6, wherein the combination of ground palm frond and dates is up to about 70% by weight of the pellets.

12. A feed product, comprising:
feed having a palm frond component, a palm fruit component, and a nutritional additive component;
wherein the palm frond component is ground palm frond that has a moisture content of less than 14% by weight of the palm frond;
wherein the palm fruit component is dates;
wherein the nutritional additive component is a grain;
wherein the feed comprises between about 40% and about 60% ground palm frond by weight of the feed, wherein the feed comprises between about 15% and about 45% dates by weight of the feed, and wherein the feed comprises between about 15% and about 35% grain by weight of the feed; and
wherein the feed has a nutritional content of between about 10% and about 30% crude protein by weight of the feed, between about 2% and about 8% crude fat by weight of the feed, and between about 20% and about 45% crude fiber by weight of the feed.

13. The product of claim 12, wherein the feed comprises between about 15% and about 35% dates by weight of the feed.

14. The product of claim 12, wherein the combination of ground palm frond and dates is up to about 70% by weight of the feed.

15. The product of claim 12, wherein the combination of ground palm frond and dates is between about 55% and about 70% by weight of the feed.

16. The product of claim 12, wherein the feed has a nutritional content of between about 10% and about 20% crude protein by weight of the feed.

17. The product of claim 12, wherein the feed has a nutritional content of between about 2% and about 5% crude fat by weight of the feed.

18. The product of claim 12, wherein the feed has a nutritional content of between about 20% and about 30% crude fiber by weight of the feed.

19. The product of claim 12, wherein the feed is a compressed mixture of the ground palm frond, the dates, and the grain.

20. The product of claim 12, wherein the feed is bagged.

* * * * *